Patented Jan. 6, 1942

2,269,366

UNITED STATES PATENT OFFICE 2,269,366

IODINE-CONTAINING DYESTUFFS

Alan August Goldberg and Bertold Paul Heinrich Wiesner, Bradford-on-Avon, England, assignors to Ward Blenkinsop & Company Limited, Brooklands, Halewood, near Liverpool, England No Drawing. Application June 18, 1941, Serial No. 398,688. In Great Britain April 16, 1940

10 Claims. (Cl. 260—178)

This invention relates to improvements in and relating to iodine containing dyestuffs.

It is already known that certain dyestuffs, notably those of the Chicago Blue and Trypan Blue series show specific affinity for certain tissues. We have now found that this affinity is not impaired and that certain pharmacologically valuable properties are acquired if these dyestuffs contain iodine.

If polynuclear diamines such, for example, as benzidine, tolidine, 4-4' diaminodiphenylmethane, dianisidine, 4-4' diaminostilbene 2-2' disulphonic acid, acriflavine and derivatives thereof and the like are tetrazotised and coupled with a naphthol- or aminonaphthol-mono- or di-sulphonic acid, dyestuffs of the Trypan Blue or Chicago Blue series are produced. In the case of the Trypan Blue series of dyes the aminonaphthol mono- or di-sulphonate could be further substituted in the ortho position to the amino group by being coupled in acid solution with a diazotised aniline, toluidine or like substance or derivative thereof.

Now we have found that if one or more of the above-mentioned components contain iodine in their molecule, they can be coupled to form iodine-containing dyestuffs of the said types, and which will have the affinity and pharmacological properties above-mentioned.

The invention, therefore, consists inter alia in the manufacture of iodine containing dyestuffs of the general type of Trypan Blue or Chicago Blue by condensing or coupling suitable components, one or more of which contain iodine in the molecule.

The condensing or coupling reactions may, of course, be carried out under any known and/or suitable conditions and it will be apparent that by varying the selection of the components from among the many substances which can be coupled to form dyestuffs of the stated types, a large number of different substances coming within the scope of the present invention can be prepared.

Thus, for example, we have found that by tetrazotising di-iodo-di-amino-diphenyl methane in cold aqueous solution and coupling this with the appropriate amino naphthol mono- or di-sulphonic acid we have been able to prepare the following iodine containing dyestuffs all of which are of the stated type, have strong tinctorial properties as well as the other special properties referred to above:

R bi-1.8-aminonaphthol-3:6-sodium disulphonate
R bi-2:8-aminonaphthol-3:6-sodium disulphonate
R bi-1:8-aminonaphthol-2:4-sodium disulphonate
R bi-1:8-aminonaphthol-4-sodium sulphonate
R bi-3:8-aminonaphthol-6-sodium sulphonate
R bi-2:8-aminonaphthol-6-sodium sulphonate where R stands for "Di-iodo-diphenylmethane-disazo-."

Similarly by replacing the di-iodo-di-amino diphenyl methane by di-iodo-di-aminostilbene-di-sulphonic acid we have prepared the corresponding series of compounds in which R is replaced by R¹ which stands for "Di-iodostilbene-sodium di-sulphonate-disazo."

All the above compounds are found to be dark micro-crystalline powders which are easily soluble in water with the production of intensely coloured solutions.

A further development of the process according to the present invention, which results in a further large number of iodine containing dyestuffs consists in further substituting the aminonaphthol-mono- or di-sulphonate either before or after the condensation by coupling it in acid solution with a diazotised iodinated or non-iodinated arylamine such as aniline, toluidine, xylidine, iodo-aniline, iodotoluidine, or iodo-xylidine. In this case this coupling is carried out in acid solution in order that the coupling of the diazotised iodinated or non-iodinated arylamine with the aminonaphthol nucleus may take place in the ortho position to the amino group.

It will, of course, be understood that as it is an object of the invention to produce iodine containing dyestuffs at least one of the components to be coupled must contain iodine, although more than one component may contain it if desired. Thus, if the diazotised arylamine which has been preliminarily coupled with the amino naphthol itself contains iodine the polynuclear diamine which is tetrazotised and used for the final coupling may or may not itself contain iodine. On the other hand if the tetrazotised polynuclear diamine is iodine containing, the arylamine compound which is diazotised and coupled with the amino naphthol may or may not contain iodine.

The final coupling of the tetrazotised diamine with the coupled amino naphthol compound is carried out in alkaline solution so that the coupling may take place ortho to the hydroxyl group.

In this way we have been able to prepare the following among other compounds:

Benzidine-, tolidine-, dianisidine-, di-iododiamino-diphenyl-methane-, and di-iododiamino-stilbene-disulphonic acid- tetrazotised and coupled with 2 mols of 1:8 amino-naphthol-2-iodotolylazo-3:6 sodium di-sulphonate; benzidine-dianisidine-, tolidine and di-iododiaminodiphenylmethane-tetrazotised and coupled with 2 mols of 1:8 aminonaphthol-2-iodotolylazo-4-sodium sulphonate; di-iododiaminodiphenyl methane tetrazotised and coupled with 2 mols of 2:8-aminonaphthol-1-iodotolylazo-3:6 sodium disulphonate, and di-iododiaminodiphenyl methane tetrazotised and coupled with 2 mols of 3:8-aminonaphthol - 4 - iodotolylazo - 6 - sodium sulphonate.

We have found further that it is not necessary for the purpose of the present invention that the iodine containing dyestuffs should be symmetrical, but that valuable iodine containing dyestuffs, having the desired properties can readily be prepared by coupling a tetrazotised polynuclear diamine, which may or may not contain iodine, unsymmetrically with one molecule of each of two different components, which may or may not themselves contain iodine provided that at least one of the three components be iodine-containing.

Thus, we have found that by condensing a polynuclear diamine, which may or may not be iodine containing, with one molecule of iodosalicyclic acid, i. e. 2-hydroxy-5-iodo-benzoic acid, and (a) with one molecule of an aminonaphthol mono- or di-sulphonic acid or (b) with one molecule of an amino naphthol-iodotolylazo-mono- or di-sulphonic acid by tetrazotising and coupling in alkaline solution dyestuffs of similarly valuable properties are obtained.

In this way the following iodine containing dyestuffs have been prepared:

Diiododiaminodiphenylmethane tetrazotised and coupled with iodosalicylic acid (1 mol) and 1:8-aminonaphthol-2-iodotolylazo - 3:6 - sodium disulphonate (1 mol).

Dianisidine tetrazotised and coupled with iodo salicylic acid (1 mol) and 1:8 aminonaphthol-2-iodotolylazo-3:6-sodium disulphonate (1 mol).

Tolidine tetrazotised and coupled with iodo salicylic acid (1 mol) and 1:8-aminonaphthol-2-iodotolylazo-3:6-sodium disulphonate (1 mol).

Benzidine tetrazotised and coupled with iodo salicylic acid (1 mol) and 1:8-aminonaphthol-2-iodotolylazo-2:6-sodium disulphonate (1 mol.).

Diiododiaminostilbene-disulphonic acid { tetrazotised and coupled with iodo salicylic acid (1 mol) and 1:8 aminonaphthol-2-iodotolylazo-3:6-sodium disulphonate (1 mol).

All of these dyestuffs are believed to be novel and they all show a selective substantivity to certain animal cells.

In order that our invention may be better understood, the following examples of how it may be carried out are given by way of illustration only:

EXAMPLE 1

This is an example of the coupling of a tetrazotised iodinated polynuclear diamine with an aminonaphthol disulphonic acid.

4.5 parts of diiododiaminodiphenylmethane which may be prepared as described below are dissolved in 100 parts of cold water and 25 parts of concentrated hydrochloric acid. This solution is cooled with ice and tetrazotised by the slow addition of 1.4 parts of sodium nitrite dissolved in 10 parts of water. This solution is then added slowly to an ice cold solution of 7.3 parts of 1:8-aminonaphthol-3:6 sodium disulphonate in 100 parts of water and 20 parts of sodium hydroxide. The mixture which rapidly assumes an intense deep purple colour is rapidly stirred for 12 hours at atmospheric temperature and finally heated on the steam bath for a further 120 hours during which time it is evaporated to a lesser volume. 20 parts of sodium chloride are then added in saturated aqueous solution and then to the well cooled solution 30 parts of hydrochloric acid. After standing for several hours the diiododiphenyl-methane-disazo bi-1:8-aminonaphthol-3:6-acid sodium disulphonate is filtered off as a steel grey microcrystalline powder. This is recrystallised from water and yields 9 parts of the pure dyestuff.

EXAMPLE 2

This is an example of the coupling of an aminonaphthol sodium disulphonate with a diazotised iodine containing arylamine in acid solution in order that coupling takes place ortho to the amino group in the naphthalene nucleus and coupling the resulting product in alkaline solution with a tetrazotised iodinated diamine.

12 parts of 1-amino-2-methyl-4-iodobenzene are converted into the hydrochloride and suspended in 200 parts of water and 50 parts hydrochloric acid. To the rapidly agitated well cooled suspension 3½ parts of sodium nitrite are added which causes the suspension to become nearly clear. To this solution is added with rapid agitation a solution of 17 parts of H-acid in 100 parts of water containing 3 parts sodium carbonate. After 1 hour a concentrated solution of 10 parts of sodium hydroxide is added and the thick brick red liquid stirred at atmospheric temperature for a further 12 hours. The liquid is then heated on the steam bath for 1 hour and the dyestuff salted out by the addition of a concentrated solution of 20 parts sodium chloride. The 1:8 aminonaphthol-2-iodotolylazo-3:6-hydrogen sodium disulphonate is filtered off as a deep brick red microcrystalline powder which can be recrystallised from water.

4.5 parts of diiododiaminodiphenylmethane are dissolved and tetrazotised exactly as in Example 1 and the cold solution run into a rapidly stirred solution of 12 parts of 1:8-aminonaphthol-2-iodotolylazo-3:6-sodium disulphonate in 175 parts of water containing 20 parts of sodium hydroxide. After stirring for 12 hours the deep purple solution is heated on the steam bath and the dyestuff then precipitated by the addition of a saturated solution of 20 parts sodium chloride and 25 parts hydrochloric acid. After recrystallisation the dyestuff is obtained as a steel grey powder which is soluble in water with production of an intense purple solution. On heating the dry dyestuff on a spatula it first chars and then decomposes with evolution of clouds of iodine vapours.

Convenient methods of preparing certain of the above-mentioned substances are here described.

*Di-iodo-diaminodiphenylmethane*

4:4'-diaminodiphenylmethane (20 gr.), iodine (55 gr.) calcium carbonate (40 gr.), ether (50 cc.) and water (30 cc.) are gently refluxed on the steam bath overnight. In the morning the mass is filtered and the residue on the filter washed with cold water. The dark residue is then extracted with ethyl alcohol (ca. 1 litre) and the alcoholic extract, after filtering off the calcium carbonate, is evaporated down to small volume and diluted with a little water. A glutinous precipitate (35 gr.) is formed which rapidly becomes friable on standing. This is separated, ground to a powder and extracted with water (250 cc.) and HCl (50 cc.) when the di-iodo-diaminodiphenylmethane dissolves leaving a residue (ca. 7 gr.) of tetra-iodo-diaminodiphenylmethane. The aqueous/HCl solution of the di-iodo-diaminodiphenylmethane is treated with dilute sodium hydroxide when the free base is precipitated as a white powder which gradually darkens on standing. Yield of recrystallised material is 25 gr. (analysis gave $I_2=56.6\%$).

*Di-iodo-diaminostilbenedisulphonic acid*

4:4'-diaminostilbene-2:2'-disulphonic acid (37 gr.) dissolved in water (150 cc.) and sodium hydroxide (20 gr.) is added rapidly to a solution of iodine (75 gr.) in water (150 cc.) and sodium hydroxide (30 gr.). The clear solution is heated on the steam bath overnight and in the morning cooled in ice. The heavy crystalline deposit is removed by filtration and recrystallised from the smallest amount of boiling water when the sodium di-iodo-diaminostilbene disulphonate (50 gr.) is obtained in glittering brown feathery plates. ($I_2$ in salt dried at $100°/10$ mm.$=38.0\%$).

We claim:

1. Iodine-containing dyestuffs consisting of a tetrazotised polynuclear diamine component coupled with a component of the group consisting of a naphthol monosulphonic acid, a naphthol disulphonic acid, an aminonaphthol monosulphonic acid, an aminonaphthol disulphonic acid, at least one of the components containing iodine in its molecule.

2. A method of manufacturing iodine-containing dyestuffs by tetrazotising components consisting of polynuclear diamines and coupling them with a component of the group consisting of: a naphthol mono-sulphonic acid, a naphthol di-sulphonic acid, an aminonaphthol mono-sulphonic acid, and an aminonaphthol di-sulphonic acid, at least one of the components containing iodine in the molecule.

3. A method of manufacturing iodine-containing dyestuffs as claimed in claim 2, in which the coupling component contains an amino group and is itself further substituted by being coupled in acid solution with a diazotised arylamine of the benzene series.

4. A method of manufacturing iodine-containing dyestuffs as claimed in claim 2 in which the coupling component contains an amino group and is itself further substituted by being coupled in acid solution with a diazotised arylamine of the benzene series containing iodine in its molecule.

5. A method of manufacturing iodine-containing dyestuffs as claimed in claim 2 in which the coupling component contains an amino group and the resulting product is further substituted by being coupled in acid solution with a diazotised arylamine of the benzene series.

6. A method of manufacturing iodine-containing dyestuffs as claimed in claim 2, in which the coupling component contains an amino group and the resulting product is further substituted by being coupled in acid solution with an iodine-containing diazotised arylamine of the benzene series.

7. A method of manufacturing iodine-containing dyestuffs as claimed in claim 2 in which the polynuclear diamine is di-iodo-di-amino-diphenyl methane.

8. A method of manufacturing iodine containing dyestuffs as claimed in claim 2 in which the polynucelar diamine is di-iodo-di-aminostilbene-di-sulphonic acid.

9. A method as in claim 2, wherein the tetrazotised component is also coupled with iodo-salicylic acid.

10. A dyestuff as in claim 1, wherein the tetrazotized component is also coupled with iodo-salicylic acid.

ALAN AUGUST GOLDBERG.
BERTOLD PAUL HEINRICH WIESNER.